Figure 1:
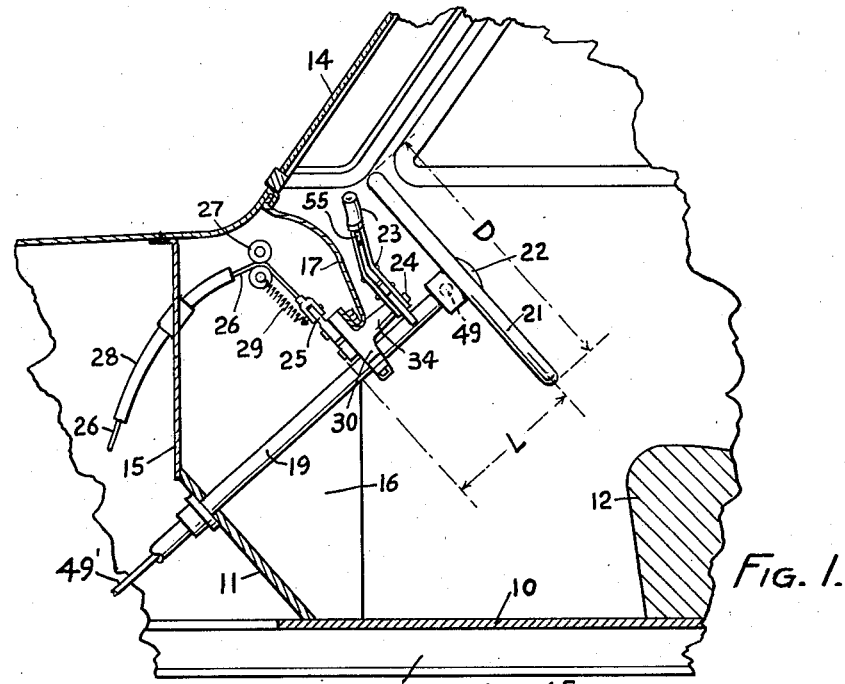

Dec. 3, 1940.  L. ILLMER  2,223,565

HAND BRAKE LEVER LINKAGE

Filed Nov. 9, 1939  2 Sheets-Sheet 1

INVENTOR.
Louis Illmer.

Dec. 3, 1940. L. ILLMER 2,223,565
HAND BRAKE LEVER LINKAGE
Filed Nov. 9, 1939 2 Sheets-Sheet 2

INVENTOR.
Louis Illmer.

Patented Dec. 3, 1940

2,223,565

UNITED STATES PATENT OFFICE 2,223,565

HAND BRAKE LEVER LINKAGE

Louis Illmer, Cortland, N. Y.

Application November 9, 1939, Serial No. 303,596

8 Claims. (Cl. 74—485)

This invention broadly relates to an improved unitary hand brake assembly adapted to releasably set up an emergency brake for automotive vehicles, and is more particularly directed to novel and compactly disposed clutch lever accessories of the self-contained type adapted to be operatively mounted directly beneath a modern steering wheel upon a fulcrum spindle, preferably installed alongside the wheel upholding column without detracting appreciably from the trim appearance of a fine body interior, the lever grip in all of its shift positions being kept within comfortable reach of a seated driver.

The present day American car trend is toward centralizing all essential manipulative controls closely around the steering column. Because of the recent more general introduction of the so-called finger tip gear shift equipped with a light touch manipulative handle that projects rightwardly from the column axis, my purpose is to likewise incorporate a non-interfering brake lever that extends leftwardly from said axis in a reversed direction from such gear shift handle. Owing to the considerable manual effort ordinarily required to tightly apply a hand brake into its set position, the lateral yield of an overhanging column is preferably counteracted by suitable reenforcement. To meet this need, I resort to a solitary brace cleat that may be secured to a relatively stiff instrument panel and which cleat fastener is herein utilized to mount therethrough a relatively short stub spindle or the like rotatable lever fulcrum disposed in parallelism with the column axis. Said spindle serves as a transmission agency which without abnormal torsional give, responsively actuates a flexible cable that is operatively connected with an emergency brake band located beneath the floor level.

It is now common practice to resort to a relatively long inverted lever of the suspended dash type located beneath the cowl at one end of the driver's seat to rock through a correspondingly small angle whereby to exert the required degree of brake lever purchase but which lever in released position, carries its grip well forward beyond easy reach of a seated driver. My hand brake lever on the contrary, is purposely made comparatively short in length and given a correspondingly wide angular sweep lengthwise of the wheel plane, the location of the lever grip being preferably kept commensurate with the radius size of a conventional steering wheel. The fact that my lever is presented to view flatwise rather than edgewise, permits the driver clearly to visualize its prevailing control position. In order to augment leverage purchase when my set emergency brake lever approaches its applied extreme of shift travel, the instant linkage may further be provided with interposed cam means of the multiplying type whereby a normal grip pull is afforded a considerable mechaniscal advantage over a conventional brake lever of equal length.

The associated lever retaining mechanism may not only be compactly grouped and confined to the region of the lever fulcrum, but its supplementary gearing may be virtually concealed beneath my brace cleat out of direct vision of the front seat occupants. In its set position, said brake lever does not interfere with the free ingress or egress of the driver; and when swung out of the way in its released position, does not obstruct reading of the instrument panels.

The object of the present improved lever assembly is to contrive an inherently simple and reliable hand brake linkage of the indicated character capable of being easily and neatly incorporated in new automotive equipment on a relatively low cost basis and to complete the centralization of essential manipulative controls about the steering column axis.

Embodied herein are also other structural details adapted to facilitate the end in view and all of which will hereinafter be more fully defined.

Reference is had to the accompanying two sheets of drawings which are illustrative of a preferred exemplification, and in which:

Fig. 1 fragmentally shows in section, an elevational view of an automotive vehicle body equipped with my improved brake lever devices.

Figure 2:
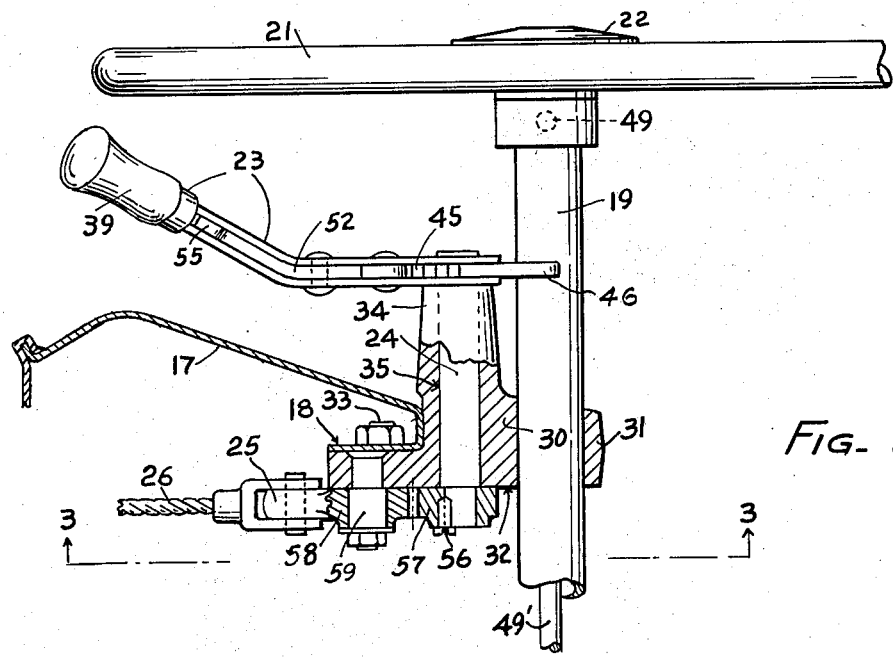
Figure 3:
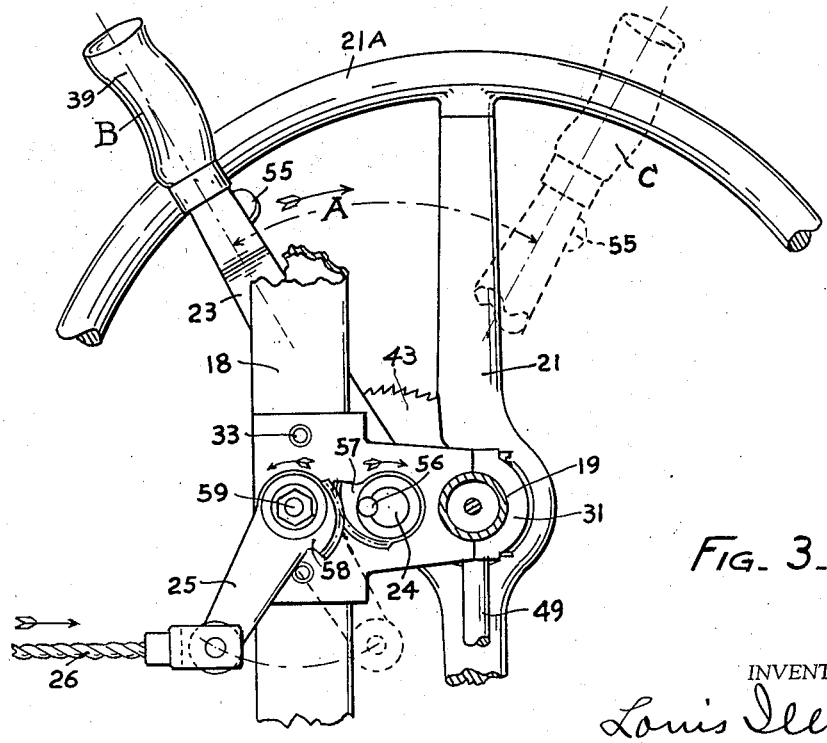

Fig. 2 is an enlarged side view of my lever assembly as taken in partial section to reveal certain details thereof, while Fig. 3 depicts a bottom view taken along line 3—3 of Fig. 2.

Figure 4:
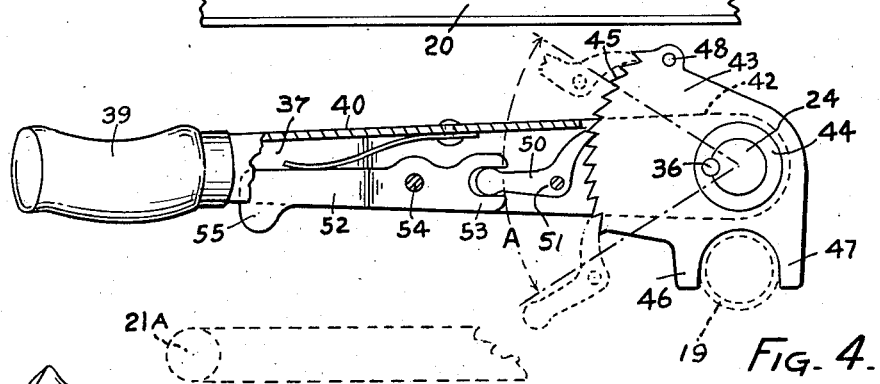
Figure 5:
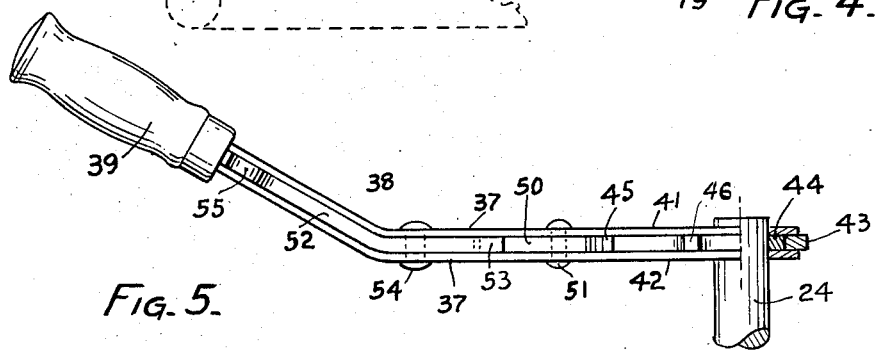

Figs. 4 and 5 respectively detail a partially sectionalized side view and an edge view of the stamped ratchet lever used in the foregoing figures.

Referring more specifically to these disclosures, an automobile usually includes the following conventional equipment, namely: a body floor 10, a forwardly inclined foot board 11, a driver's seat 12, a transparent windshield 14, and a cowl chamber partition 15 extending between the body side walls such as 16. A rigid instrument panel 17 of stamped sheet metal or the like may fixedly span said walls ahead of the front door jambs as in Fig. 1. The depending transverse edge of said panel may be inturned to provide for an apertured flange 18 (see Fig. 2). A tubular steering wheel column 19 may be provided with conventional foot bracket means upheld by the chassis frame 20 and which inclined column may overhangingly extend upwardly through the foot board and rearwardly therefrom to terminate in the spoked steering wheel 21. The wheel hub may be provided with the usual horn button 22 or the like accessories, all centralized forwardly within convenient reach of the driver.

The instant improvements are primarily concerned in further equipping said reenforced column with a ratchet brake lever 23 of the emergency type disposed closely beneath the plane of the steering wheel and above the panel 17 and which flat sided lever is provided with an affixed stub fulcrum spindle 24 rotatably mounted in parallelism with the column axis through a solitary supporting bracket such as 30. The lower end of my fulcrum shaft may be geared to a purchase multiplying linkage that includes a lever actuated arm or the like rocker such as 25. A flexible cable 26 may be longitudinally operated in response to such rocker movements and run over the guide pulleys 27, thence may be smoothly carried forwardly of the panel 17 through arcuate tubular armour 28 and beneath the floor level to a rear wheel emergency brake drum. A spring agency 29 may serve to return the released lever into its off position.

In order to steady the overhanging column against any heavy lateral thrust when the driver fully applies such brake lever, the upper region of my column is rigidly reenforced by a single metallic brace cleat 30 located closely beneath the steering wheel hub and arranged to clamp the tubular column 19 to the panel flange 18 or the equivalent thereof. Such brace cleat may likewise be incorporated integrally with the sheet metal panel 17. A manipulative finger tip gear shift handle 49 of the kind now being furnished as standard equipment in recent Ford car models or the like, may extend radially rightward from the wheel hub and be operatively connected interiorly of the column to the gear shift box by the rod 49'. However, my self-contained brake lever devices are not mechanically dependent upon the association of such handle.

The unitary cleat 30 may comprise a demountable cap portion 31 shaped to embrace the column, also a flat base face 32 that preferably extends perpendicularly away from the column axis as shown. Said cleat may be rigidly secured to the panel flange 18 by plural studs such as 33. A tubular stanchion or prop component 34 is shown erected upon said brace cleat of which the transverse cylindrical through bore 35 may lie coincident with or in offset parallelism to the column axis, its center preferably being located between the panel 17 and said axis as in Fig. 2. The exact shape of the disclosed prop is immaterial and may be otherwise disposed without functional change, the more essential feature residing in providing for a suitable brace cleat having a bore therethrough. Rotatably mounted in said bore is a solid or tubular stub fulcrum spindle 24, this being kept comparatively short in length for inherent stiffness. The overall spindle length is purposely made considerably shorter than the major portion of the column 19 to obviate excessive torsional springing effects when a heavy twisting moment is applied to such stub fulcrum by the brake lever. The upper stub spindle end has the lever hub fixedly secured thereto.

Because of the conspicuous position of my lever linkage, the visible cleat components are compactly and neatly shaped. For the same reason, the brake lever 23 is preferably fabricated from heavy stamped sheet metal stock to comprise a cross-sectionally U-shaped shank portion of which the closely spaced side flanges 37 may be laterally kinked at 38 to carry a suitable grip 39 into adjacency with the steering wheel rim 21A but spaced therefrom to provide for adequate finger clearance. The upwardly kinked lever end correspondingly reduces the stub spindle length in the Fig. 5 manner. Such grip disposition serves to freely clear the body parts when my brake lever is swung forwardly into released position between the wheel rim and a modern instrument panel of the kind represented in Fig. 1.

The lever web portion 40 is preferably kept narrow relative to the flange width and may be cut away (see Figs. 4 and 5) to provide for mated parallel forks 41 and 42 that may snugly straddle opposed side faces of a stamped sheet metal sector plate 43. In order to firmly grip the spindle 24, I may introduce a reenforcing hub ring 44 between the relatively thin forks and drive a common dowel pin 36 therethrough as indicated. A heavy pull exerted upon the lever grip will thereby be well distributed and positively applied to rotate my stub spindle when subjected to heavy twist loading.

Said sector plate 43 may be provided with a series of fine pitched ratchet teeth 45 disposed concentrically about and at a comparatively short radial distance from the spindle axis. A medial plate region may be bored and freely centered around the ring perimeter. The sector plate may further be provided with complementary saddle lugs 46 and 47 that extend rearwardly from the stub shaft axis to snugly engage the steering column 19 indicated by dotted outline in Fig. 4. Said lugs hold the ratchet teeth in a stationary relation to said spindle when the brake lever is swung through the wide angular limits designated as A. In opposed extreme travel positions, a lever fork respectively abuts the stop pin 48 or strikes the column 19. Such stationary ratchet teeth and combined stop means serve the swinging lever in a simple manner without requiring extensive structural modification in the usual steering column. My ratchet mechanism is compactly incorporated adjacent to the brake lever fulcrum and may be remotely released while operatively grasping the distant grip 39.

A stamped bell crank pawl 50 may be pivoted at 51 between the shank flanges 37 as in Fig. 5. A loosely interposed trip lever 52 of the balanced spring actuated type may also be stamped from sheet metal to include spaced tines such as 53 which engage a round nose end of the bifurcated pawl. Said trip lever may be kinked to conform to the brake lever shape and medially pivoted at 54. Its radially outermost end may provide for a manipulative trigger piece or thumb latch 55 that extends laterally beyond the shank flange confines in close proximity to the lever grip 39, as shown.

Referring now in detail to Figs. 2 and 3, the lower end of my stub fulcrum spindle 24 may be keyed at 56 to a segmental drive gear 57. A driven gear 58 may be rotatably mounted upon the depending journal 59 to include an integral rocker arm 25 by which the cable 26 may be actuated. The meshing teeth of the mated gears or multiplying camming means 57 and 58 are preferably of the quick return elliptical gear type whereby the brake lever when in its released or off position B, initially possesses a comparatively small purchase with respect to said rocker arm but which purchase is augmented as the brake lever approaches its set position marked C. If desired, the cable actuating arm may likewise be carried directly by the hub of the gear 57 without need of any interposed multiplying gearing; in either event, the unitary brace cleat 30 suffices to mount all associated components comprised in my linkage.

The compact assembly of my brake lever parts is such that it may be confined above the foot board 11 within an overall distance L taken lengthwise of the column and which length dimension may be kept materially shorter than a conventional wheel diameter D (see Fig. 1). In the fully applied lever position C, the thumb latch 55 still lies well back and above the lowermost wheel rim portion so as not to be inadvertently wiped by the driver's leg. The lever grip 39 is also effectively placed to allow of an uncramped, natural maximum pull effort directed toward the driver when applying the emergency brake. Said grip may be provided with a rubber sleeve having an enlarged knobbed end and a concaved shank to prevent hand slippage. It will also be observed that when the brace cleat 30 is assembled as a unit, all of its component parts may be factory tested for performance prior to being installed into place.

Having described the structural features of my brake lever assembly, the intended function thereof is thought to be obvious. In further clarification, the mode of operation may be traced by reference to Fig. 3. When assuming its released upward position B, represented by full lines, the lever 23 will stand away from the seated driver as indicated in Fig. 1. To apply the brake lever, its grip 39 is inclinedly drawn downwardly and rearwardly toward the dotted position C. As a result, such initial lever movement will cause a relatively rapid take up movement of the cable arm 25 because the teeth of the gear 57 then stand at a comparatively large radial distance from the spindle axis. When the brake lever approaches its extreme of applied travel C, the radially inward teeth of the drive gear 57 will come into play. An augmented leverage purchase is thereby attained with respect to the meshed teeth of the mated gear 58 which in turn slows up the relative travel rate of the rocker 25 and correspondingly increases the cable pull for a given final brake lever effort. As will be apparent, the pawl 50 automatically follows up and engages a corresponding ratchet tooth to retain the lever in its applied position until released by depressing the thumb latch 55.

When standing in its applied position, the grip of my hand brake lever still lies clear of the lower rim confines of the steering wheel and does not constitute a barrier likely to encroach upon the comfortable entry to the driver's seat. By keeping the set position of the hand lever clearly within direct sight of the driver, he is unlikely to attempt starting up a car while the emergency brake lever remains set. When released into the idle position B, the lever is shifted out of the way without materially obstructing the reading of the panel instruments.

As an alternative, a frictional type of clutch mechanism of the kind disclosed in my copending application, Serial No. 265,250, filed March 31, 1939, may be substituted in lieu of the ratchet and pawl retaining means specifically detailed herein. As a further modification, the lever forks may be fulcrumed around the column by the use of a tubular fulcrum shaft.

As will be understood by those skilled in this art, various other changes in the structural details and disposition of my emergency brake lever devices may be resorted to in likewise carrying out the illustrative embodiment, all without departing from the spirit and scope of my invention heretofore described and more particularly defined in the appended claims.

I claim:

1. In a brake lever assembly applicable to an automotive vehicle body equipped with a transverse instrument panel together with a steering wheel supported by a rearwardly inclined column and of which wheel a forward rim region spacedly overhangs a panel portion, the combination of a unitary brace cleat bridgingly connecting the column to the panel beneath the plane of said wheel and provided with a transverse bore whose length lies in substantial parallelism with the column axis, a fulcrum spindle mounted through said bore, a releasably retained emergency brake lever having one end affixed to the upper terminal region of said spindle, the opposite lever end being provided with a manipulative grip that extends into proximity with the wheel rim and which grip in its released extreme of lever travel is shiftable in parallelism with said plane into the spacing between the aforesaid forward rim region and its underlying panel portion, rocker means actuated by the lower terminal region of the spindle in unison with the lever movements, and brake actuating means operatively attached to said rocker means and carried forwardly of the panel and downwardly beneath the body floor level.

2. In a self-contained brake lever assembly applicable to an automotive vehicle body equipped with a transverse instrument panel together with a steering wheel supported by a rearwardly inclined column provided with a gear shift handle that extends radially therefrom, the combination of a unitary brace cleat bridgingly connecting the column to the panel beneath the plane of said wheel and having therethrough a transverse bore whose length lies in substantial parallelism with the column axis, a stub fulcrum spindle rotatably mounted through said bore to terminate adjacent the respective bore extremities, a shiftable emergency brake lever of which one end is affixed to the upper terminal region of said spindle and the opposite lever end is provided with a manipulative grip extending into proximity with the wheel rim in an opposed direction from the shift handle extension, apertured sector plate means having said spindle entered therethrough, means confining the sector plate means in a stationary relation to said entered spindle, lever retaining means arranged to releasably engage said plate, remote control means including a trip lever pivoted to the brake lever and having a manipulative latch device carried adjacent the lever grip for releasing the engaged retaining means, and brake actuating rocker means pivotally attached beneath the brace cleat and actuated by the stub spindle in unison with corresponding lever shift movements.

3. In a brake lever assembly applicable to an automotive vehicle body equipped with a transverse instrument panel together with a steering wheel supported at the top of a rearwardly inclined column, a unitary brace cleat bridgingly connecting the column to the panel beneath the plane of said wheel and comprising tubular prop means having a bore disposed substantially parallel to the column axis with the bore center located medially of the bridging cleat length, a fulcrum spindle mounted through said bore, a shiftable emergency brake lever of sheet metal having a U-shaped cross-sectional profile to include laterally spaced flange forks at one lever end and which forks are affixed to the upper terminal region of said spindle, the opposite lever end being provided with a grip extending into proximity with the wheel rim, a stationary sector plate including ratchet teeth interposed between the flange forks and which plate is provided with saddle lug means extending into engagement with said column, pawl means arranged to releasably engage said teeth, and remote control means pivoted to said lever and including a manipulative latch device carried adjacent the lever grip for releasing the engaged pawl.

4. In a brake lever assembly applicable to an automotive vehicle body equipped with a transverse instrument panel together with a steering wheel supported by an inclined column, a unitary brace cleat bridgingly connecting the column to the panel beneath the plane of said wheel and comprising tubular prop means having a bore disposed in substantial parallelism with the column axis, a fulcrum spindle mounted through said bore, a shiftable emergency brake lever of sheet metal having a cross-sectionally U-shaped shank profile to include a pair of apertured flange forks at one shank end, a hub ring interposed between said forks in registry with the apertures thereof and having the upper terminal region of the spindle affixed thereto, stationary sector plate means having an aperture that rotatably centers the hub ring therein, lever retaining means arranged to releasably engage said plate, and brake actuating rocker means pivotally attached closely beneath the brace cleat and positively actuated by the lower terminal region of the spindle in unison with corresponding lever shift movements.

5. In a brake lever assembly applicable to an automotive vehicle body equipped with a transverse instrument panel together with a steering wheel supported by an inclined column, a unitary brace cleat bridgingly connecting the column to the panel beneath the plane of said wheel and having therethrough a transverse bore whose length is disposed in substantial parallelism with the column axis with the bore center located medially of the bridging cleat length, a stub fulcrum spindle mounted through said bore to a shiftable emergency brake lever of sheet metal having a cross-sectionally U-shaped shank profile to include laterally spaced side flanges that are forked at one shank end and which forks are affixed to the upper terminal region of said spindle, the medial flange region being laterally kinked and the opposite shiftable lever end extending upward into proximity with the wheel rim, a stationary sector plate mounted between said forks and including a series of ratchet teeth arranged radially about the spindle axis, pawl means interposed between the lever flanges to releasably engage said teeth, a trip lever also interposed between the aforesaid flanges and pivoted to said brake lever radially inward from the kink thereof, the trip lever portion lying radially beyond its pivot being shaped to conform with said brake lever kink, and brake actuating rocker means pivotally attached beneath the brace cleat and actuated by the lower terminal region of the stub spindle in unison with corresponding lever shift movements.

6. In a brake lever assembly applicable to an automotive vehicle body equipped with a transverse instrument panel together with a steering wheel supported by a column, a brace cleat bridgingly connecting the column to the panel beneath the plane of said wheel and provided with a transverse bore that lies in substantial parallelism with the column axis, a fulcrum spindle mounted through said bore, a releasably retained emergency brake lever having one end affixed to said spindle and the other end provided with a grip that extends into proximity with the wheel rim and which grip is shiftable in parallelism with said plane from a released brake position into an applied extreme of travel, rocker means pivoted to the brace cleat, and interposed mated quick return gear means respectively affixed to the spindle and to the rocker means whereby to multiply the leverage purchase of said grip when the brake lever closely approaches its applied extreme of shift travel.

7. In a brake lever assembly applicable to an automotive vehicle body equipped with a transverse instrument panel together with a steering wheel supported by a column inclined rearwardly toward a driver's seat, a brace cleat bridgingly connecting the column to the panel beneath the plane of said wheel and having therethrough a transverse bore whose length lies in substantial parallelism with the column axis, a fulcrum spindle mounted through said bore to terminate adjacent the respective bore extremities, a shiftable emergency brake lever of which one end is affixed to the upper terminal region of said spindle and the opposite lever end is provided with a shiftable grip extending into proximity with the wheel rim, stationary means serving to releasably retain said lever in its applied brake position, elliptical drive gear means affixed to the lower terminal region of said spindle, mated elliptical driven gear means pivoted to the brace cleat and meshing with said drive gear means to augment leverage purchase of said grip when shifted into its applied position, and rocker means actuated in unison with said driven gear means.

8. In a brake lever assembly applicable to an automotive vehicle body equipped with a transverse instrument panel together with a steering wheel supported by a rearwardly inclined column and of which wheel a forward rim region spacedly overhangs a panel portion, the combination of a brace cleat located beneath the plane of said wheel and serving to bridgingly connect the column to the panel, an emergency brake lever disposed to shift between said panel and the wheel, a fulcrum spindle mounted in substantial parallelism with the column axis and having one lever end affixed thereto, the other lever end being extended into proximity with the wheel rim, stationary sector means disposed above the panel in a concentric relation to the spindle axis, positively lockable pawl means carried by said lever and arranged to releasably engage the sector means, remote control means including manipulative pawl unlocking means also carried by the lever, and rocker arm means located beneath said panel to extend perpendicularly outward from the spindle axis in substantial parallelism with the affixed end of said brake lever and which arm is actuated in unison with said lever.

LOUIS ILLMER.